US006715792B2

(12) United States Patent
Yamachi et al.

(10) Patent No.: US 6,715,792 B2

(45) Date of Patent: Apr. 6, 2004

(54) SEAT BELT SYSTEM FOR A VEHICLE

(75) Inventors: Ippei Yamachi, Hiroshima (JP); Hiroaki Nakao, Hiroshima (JP); Masanobu Fukushima, Hiroshima (JP); Hiroaki Takeshita, Hiroshima (JP); Masashi Ohtsuka, Hiroshima (JP); Hiroshi Okugawa, Hiroshima (JP)

(73) Assignee: Mazda Motor Corporation (JP)

( * ) Notice: Subject to any disclaimer, the term of this patent is extended or adjusted under 35 U.S.C. 154(b) by 44 days.

(21) Appl. No.: 10/211,229

(22) Filed: Aug. 5, 2002

(65) Prior Publication Data

US 2003/0042725 A1 Mar. 6, 2003

(30) Foreign Application Priority Data

Aug. 7, 2001 (JP) ....................................... 2001-238623

(51) Int. Cl.[7] ............................................... B60R 22/20

(52) U.S. Cl. .................... 280/801.2; 280/803; 297/481; 297/483

(58) Field of Search ........................... 280/801.2, 801.1, 280/802, 803, 808; 297/468, 469, 483, 481

(56) References Cited

U.S. PATENT DOCUMENTS 4,213,638 A * 7/1980 Sacco et al. ............. 280/801.2
4,445,722 A * 5/1984 Schaper ...................... 297/468
5,294,184 A * 3/1994 Blake et al. ................ 297/473
5,431,446 A * 7/1995 Czarnecki et al. .......... 280/802
5,934,759 A * 8/1999 Paschek et al. ............. 297/481
6,308,986 B1 * 10/2001 Townsend et al. .......... 280/807
6,485,058 B1 * 11/2002 Kohlndorfer et al. ....... 280/808

FOREIGN PATENT DOCUMENTS

EP 0 543 706 A1 5/1993
EP 0 716 963 A1 6/1996
JP 2001-105864 A 4/2001

OTHER PUBLICATIONS

Patent Abstracts of Japan vol. 13, No. 133 (M–809), Apr. 4, 1989 & JP 63 301146 A (OI Seisakusho Co.) Dec. 8, 1988Abstract.
European Search Report (Dated Dec. 11, 2002).

* cited by examiner

*Primary Examiner*—David R. Dunn
(74) *Attorney, Agent, or Firm*—Nixon Peabody LLP; Donald R. Studebaker

(57) ABSTRACT

A seat belt system for a vehicle for restraining an occupant in a first seat mounted in a passenger compartment of the vehicle, the vehicle including an opening formed on at least one side of a vehicular body. The seat belt system includes a belt webbing having a first and second end. A retractor is disposed at a door of the vehicle for retracting the first end of the belt webbing. A lap-anchor device is disposed at the door of the vehicle for fixedly supporting the belt webbing below and outward of the first seat. The lap-anchor device includes an anchor bracket and a moving device. The anchor bracket is connected with the second end of the belt webbing. The anchor bracket includes an engaging portion which communicates with an engageable portion provided at the vehicular body below the opening. The anchor bracket is also movable between a first position above the lower edge of the door where the anchor bracket does not impede the opening and closing motion of the door and a second position below the lower edge of the opening where the engaging portion engages the engaged portion when the door is closed. The moving device moves the anchor bracket between the first position and the second position.

17 Claims, 6 Drawing Sheets

SEAT BELT SYSTEM FOR A VEHICLE

BACKGROUND OF THE INVENTION

1. Field of the Invention

The present invention relates to a seat belt system for a vehicle, and more particularly, to a seat belt system for a front seat of a vehicle having a double-door structure.

2. Description of the Related Art

Conventionally, in a vehicle of a passenger car or like, a three-point seat belt restraint configuration for a front seat includes a retractor for retracting a webbing, a shoulder anchor for slidably supporting the webbing above and outward of a passenger, and a lap anchor for fixedly supporting the webbing below and outward of the passenger, which are disposed on a center pillar of a vehicle body. However, in a vehicle having a double door structure with no center pillar, the retractor, the shoulder anchor, and the lap anchor of a seat belt system for a front seat are disposed in the rear door in consideration of convenience for the rear passengers during ingress or in egress, as disclosed in Japanese Patent Publication No. 2001-105864.

When the lap anchor is disposed in the center pillar of the body, the location of the lap anchor (or an anchor point) can be positioned below the lower edge of the door. However, when the lap anchor is disposed in the rear door as described above, the lap anchor is inevitably positioned above the lower edge of the door so as not to impede the opening and closing motion of the rear door, which results in a higher location of the anchor point. This causes no problem for the passenger protection in a vehicle which provides a relatively higher hip point for the passenger, but may cause a problem in a vehicle which provides a relatively lower hip point for the passenger. That is, the higher anchor point may possibly be inadequate for the seat belt to protect the passenger, because the webbing restraints the passenger at a relatively higher location thereon.

SUMMARY OF THE INVENTION

In view of the above problem, an object of the present invention is to optimize the passenger protection performance of a seat belt system for a passenger in a front seat without impairing the convenience for the rear passengers during ingress or egress, particularly in a vehicle adopting a double-door structure with no center pillar and also providing lower hip point restraint for the passenger.

In accomplishing these and other objects of the present invention, there is provided a seat belt system for a vehicle for restraining an occupant in a first seat mounted in a passenger compartment of the vehicle, the vehicle including an opening formed on at least one side of a vehicular body. The seat belt system includes a belt webbing having a first and second end. A retractor is disposed at a door of the vehicle for retracting the first end of the belt webbing. A lap-anchor device is disposed at the door of the vehicle for fixedly supporting the belt webbing below and outward of the first seat. The lap-anchor device includes an anchor bracket and a moving device. The anchor bracket is connected with the second end of the belt webbing. The anchor bracket includes an engaging part which communicates with an engageable partion provided at the vehicular body below the opening. The anchor bracket is also movable between a first position above the lower edge of the door where the anchor bracket does not impede the opening and closing motion of the door and a second position below the lower edge of the opening where the engaging portion engages the engaged portion when the door is closed. The moving device moves the anchor bracket between the first position and the second position.

Accordingly, the moving device moves the anchor bracket in the vertical direction between the first position and the second position. When the door is open, the anchor bracket is moved to the first position, so as not to impede the opening and closing motion of the door. On the other hand, when the door is closed, the anchor bracket is moved downwardly to engage the engageable part, so that the second end of the belt webbing is fixed below the lower edge of the opening via the anchor bracket, thereby providing the optimized passenger protection performance of the seat belt system. In addition, when the engaging portion engages the engageable part, the door and the body can share load transmitted from the belt webbing via the lap-anchor device and the engaged portion, which can prevent the deformation or damage to the door and the body to ensure the passenger restraint performance of the seat belt system.

These and other objects, features, aspects, and advantages of the present invention will become more apparent from the following detailed description of the preferred embodiment relative to the accompanied drawings, in which:

DETAILED DESCRIPTION OF THE INVENTION

Figure 1:
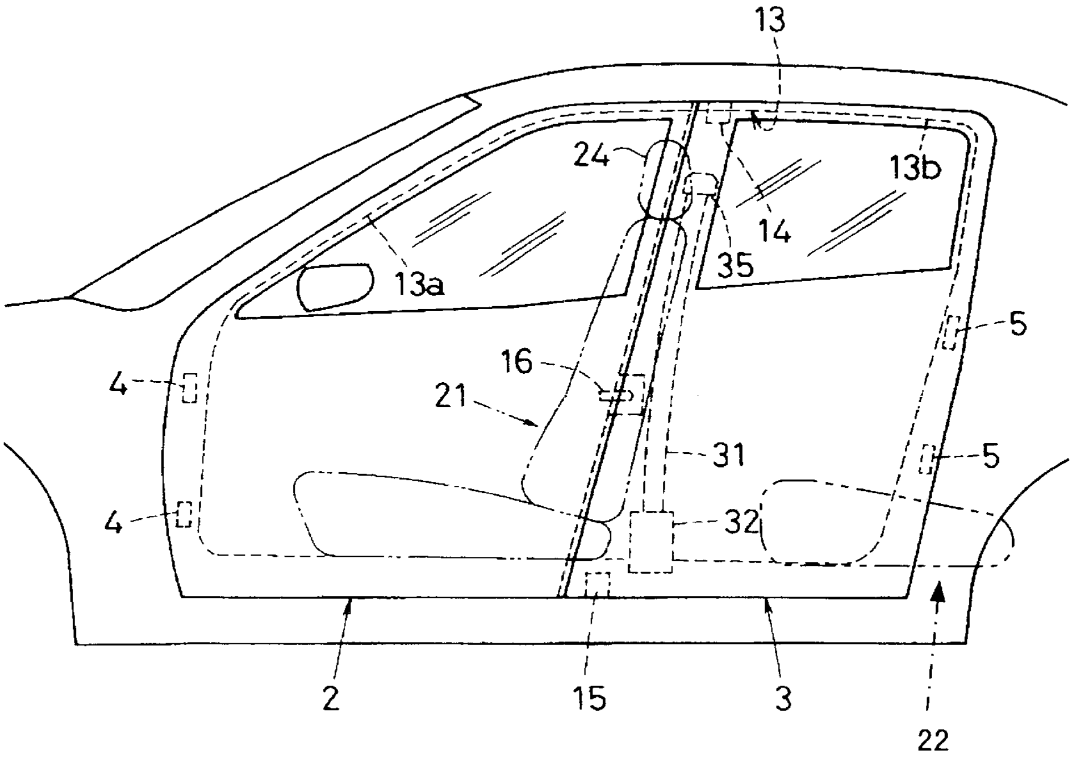
FIG. 1 is a side view of a vehicle equipped with a seat belt system according to the present invention.

Preferred embodiments of the present invention will now be described with reference to the appended drawings. It should be appreciated that although the embodiments are separately described, single features may be described in additional embodiments. Referring to FIG. 1, a body structure of the present invention includes a front seat 21 and a rear seat 22 arranged in the longitudinal direction in a passenger compartment of a vehicle. At least one side of the vehicular body is formed with an ingress and egress opening 13*a* for the front seat passenger and an ingress and egress opening 13*b* for the rear seat passenger, through which the passengers can enter into and exit out of the passenger compartment.

As shown in FIG. 1, the front opening 13*a* can be opened and closed by a front door 2 pivotally supported on the body via hinges 4 at its leading edge. Likewise, the rear opening 13*b* can be opened and closed by a rear door 3 pivotally supported on the body via hinges 5 at its trailing edge. The openings and doors constitute a side door structure in a so-called double door configuration.

The openings 13*a*, 13*b* form a continuous aperture so as to provide a body structure without a center pillar. The aperture can be cooperatively opened and closed by both the doors 2, 3 described above.

At the upper portion and the lower portion of the leading edge of the rear door 3, locking members 14, 15 are provided for locking the rear door 3 with the body, respectively. At the middle portion of the trailing edge of the front door 2, a locking member (not shown) is provided for locking a striker 16.

In this embodiment, the locking members 14, 15 are not allowed to release their locking function until the front door 2 is open. Therefore, in the double door configuration in this embodiment, the front door 2 must be opened prior to the rear door 3, or in other words, rear door 3 is allowed to open only after the front door 2 opens. Alternatively, the front door 2 and the rear door 3 may be constructed so as to independently open and close the corresponding portions of the continuous aperture.

Figure 2:
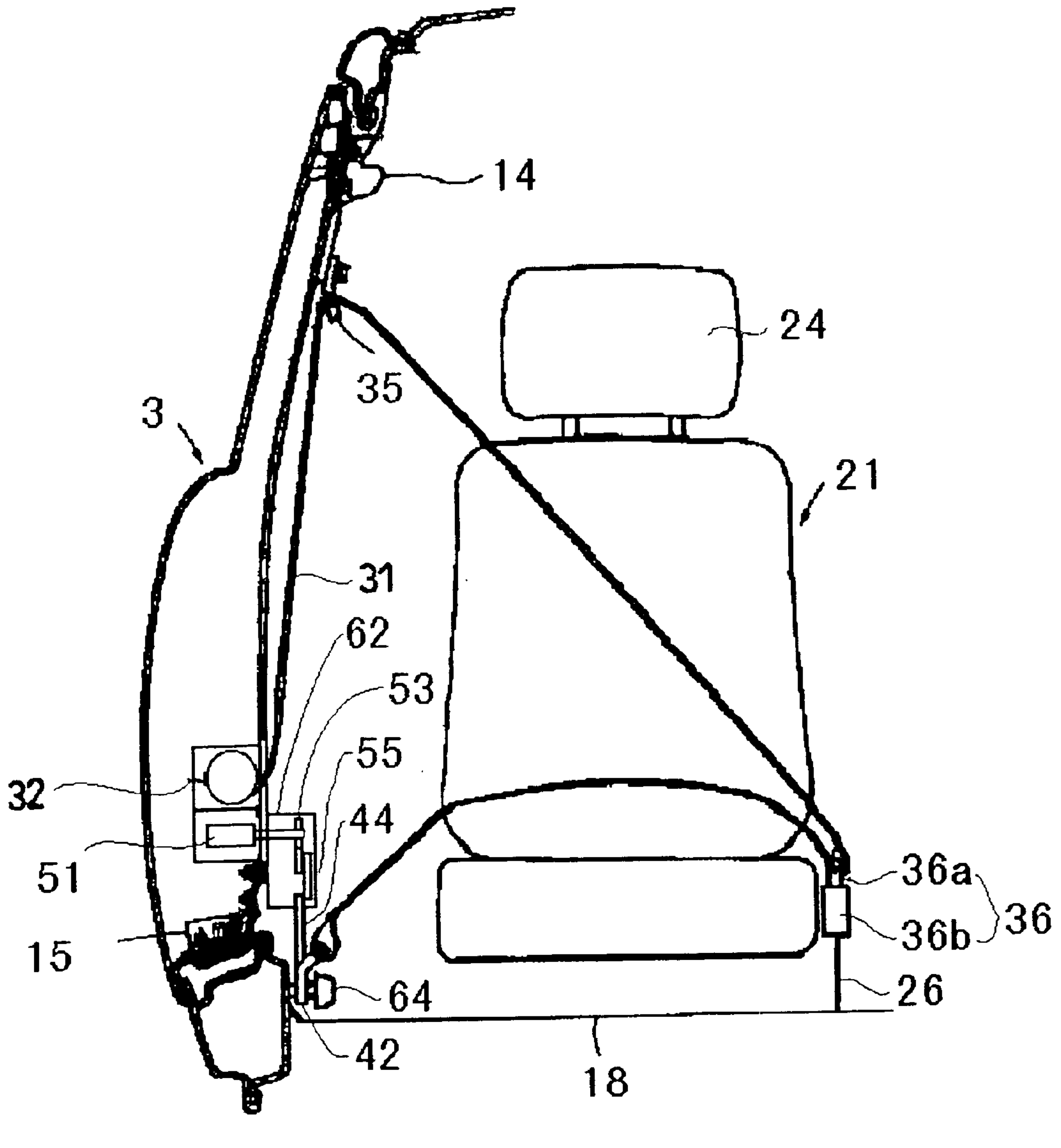
FIG. 2 is a vertical cross-sectional view of a rear door and a seat belt system according to the first embodiment of the present invention, taken from the inboard side.

The construction and arrangement of a seat belt for the front seat is shown in FIGS. 1 and 2. Referring to FIG. 2, the seat belt system for the front seat includes a belt webbing 31 for restraining a passenger, a retractor 32 disposed in the lower portion of the rear door 3 for retracting and holding the webbing 31 in a vehicular collision, a shoulder anchor 35 serving as a first supporting point of the seat belt system and disposed on the upper portion of the rear door 3, for slidably supporting the webbing 31, a tongue and buckle set 36, serving as a second supporting point of the seat belt system, and slidably supporting the webbing 31 below and inboard of the front seat passenger; and a lap anchor 42, serving as a third supporting point of the seat belt system, for fixedly supporting the webbing below and outward of the front seat passenger.

The tongue and buckle set 36 consists of a tongue 36*a* and a buckle 36*b* , which can be releasably fastened. When the tongue 36*a* and the buckle 36*b* are fastened, the tongue and buckle set 36 is fixed as a whole to a floor panel 18 via a bracket 26 so as to support the webbing 31 below and inboard of the front seat passenger.

The retractor 32 is disposed in a front structural door-member of the rear door with the equivalent rigidity to that of a center pillar which would be otherwise provided, and configured to retract the webbing 31.

The shoulder anchor 35 is attached on the inboard side of the upper portion of the front structural door-member so as to face a head rest 24 of the front seat 21. That is, the webbing 31 extends from the retractor 32 through a door trim (not shown) disposed on an inboard side of the front structural door-member to a passenger compartment, passes through a belt guide slit of the shoulder anchor 35 and to tongue 36*a* which is capable of engaging the buckle 36*b* of the tongue and buckle set 36 for fastening the seat belt, and reaches the lap anchor 42 at the front and lower portion of the rear door to which the end of the webbing 31 is connected.

Figure 3:
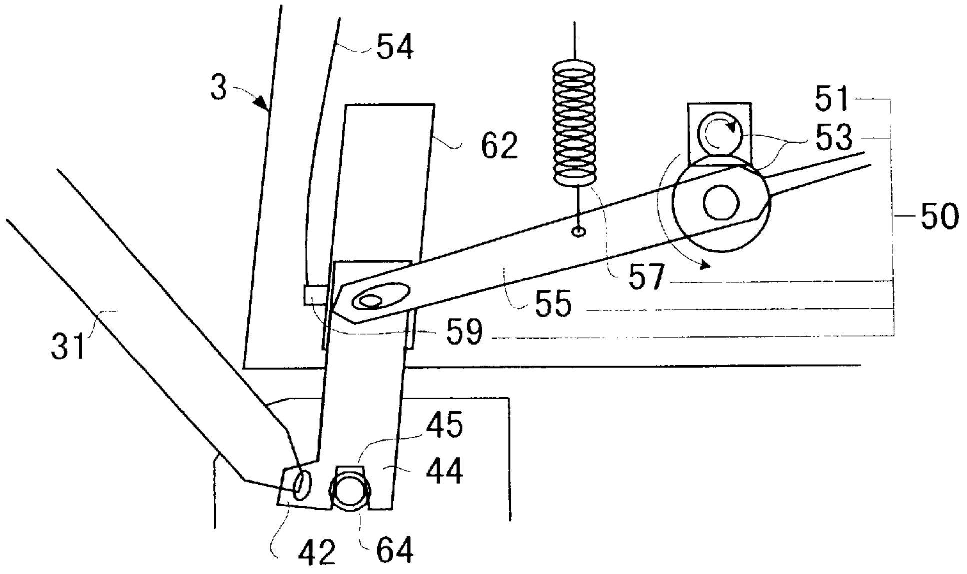
FIG. 3 is a side view of a lap anchor according to the first embodiment of the present embodiment taken from the inboard side.

The structure and action of the lap anchor will be described with reference to FIGS. 2 and 3. As shown in FIG. 2 and FIG. 3, the lap anchor 42 according to the first embodiment of the invention includes: an anchor bracket 44 provided with the lap anchor 42; a supporting member 62 disposed on the rear door 3, for slidably supporting the anchor bracket 44 in the vertical direction; a moving mechanism (or an electrically moving mechanism) 50 for moving the anchor bracket 44 to such an upper position that the bracket 44 does not impede the opening and closing motion of the rear door 3 while the rear door 3 is being open or closed, and for moving the anchor bracket 44 to a lower position when the rear door is closed; and an anchor pin 64 disposed on the lower portion of the body below the rear door 3, with which a notch 45 formed at the lower end of the anchor bracket 44 engages when the rear door 3 is closed and the anchor bracket 44 is at the lower position.

The moving mechanism 50 includes: a motor 51 which produces a rotational force; a gear 53 for transmitting the rotational force by the motor 51 to a link 55; the link 55 being rotated by the transmitted rotational force from the motor 51, to cause a pin provided on the anchor bracket 44 and loosely fitted into an oblong opening at an end of the link 55 to slide within the opening so as to move the anchor bracket 44 between the upper position and the lower position; a spring 57 connected to the link 55 and producing upward biasing force thereon; and a stopper pin 59 interlocked with a rear-door knob (not shown) via a cable 54 and disposed on the supporting member 62 so as to hold the anchor bracket 44 at the lower position when the bracket 44 engages the anchor pin 64 after the bracket 44 reaches the lower position.

The movement of the lap anchor 42 according to the first embodiment of the present invention occurs as follows. When the rear door 3 shifts from its open state to its closed state, the change in the state of the rear door 3 is detected in the form of a change in output voltage at a rear door switch (not shown) disposed in the rear door 3 or a buckle switch (not shown) disposed on the tongue and buckle set 36.

Based on the detection of the change in the output voltage at the rear door switch or the buckle switch, the rear door 3 is determined to have shifted to the open state from the closed state, and a confirmation timer (not shown) is activated. If an additional change in the output voltage at the rear door switch or the buckle switch is detected while the confirmation timer is measuring time, the rear door 3 is determined to have been restored to the closed state, the control routine is cancelled and the position of the lap anchor 42 maintains unchanged.

If no change in the output voltage at the rear door switch or the buckle switch is detected before a certain period of time expires as measured by the confirmation timer, the rear door 3 is confirmed to have shifted to the open state, and the motor 51 is rotated clockwise as shown in FIG. 3 (or in the direction indicated by the arrow in FIG. 3). The rotational force by the motor 51 is transmitted to the link 55 via the gear 53 and causes the link 55 to rotate counterclockwise (or in the direction indicated by the arrow in FIG. 3). Thus, the anchor bracket 44 is moved downwardly against the upward biasing force of the spring 57, because the anchor bracket 44 connected to an end of the link 55 is restricted by the supporting member 62 to move only in the vertical direction.

The downward movement of the anchor bracket 44 terminates in such a manner that the notch 45 formed at the lower end of the anchor bracket 44 engages the anchor pin 64 fixed to the body below the rear door 3. At the same time, the stopper pin 59 disposed on the supporting member 62 fits into the upper end of the anchor bracket 44.

In other words, as shown in FIG. 3, the anchor bracket 44 stops its downward movement with its lower end being supported by the anchor pin 64 fixed to the body and its upper end being supported by the supporting member 62 and the stopper pin 59 disposed on the rear door 3. The motor 51 is then de-energized upon detecting lock current.

When the rear door 3 shifts from its closed state to its open state, the operation of the rear door knob (not shown) causes the stopper pin 59 to move in such a direction as to disengage the anchor bracket 44 from the supporting member 62 via the cable 54 connecting the rear door knob with the stopper pin 59. Then, the anchor bracket 44 is quickly moved upwardly by the upward biasing force of the spring 57 disposed on the link 55 to such a location as to be restricted by the supporting member 62.

Figure 4:
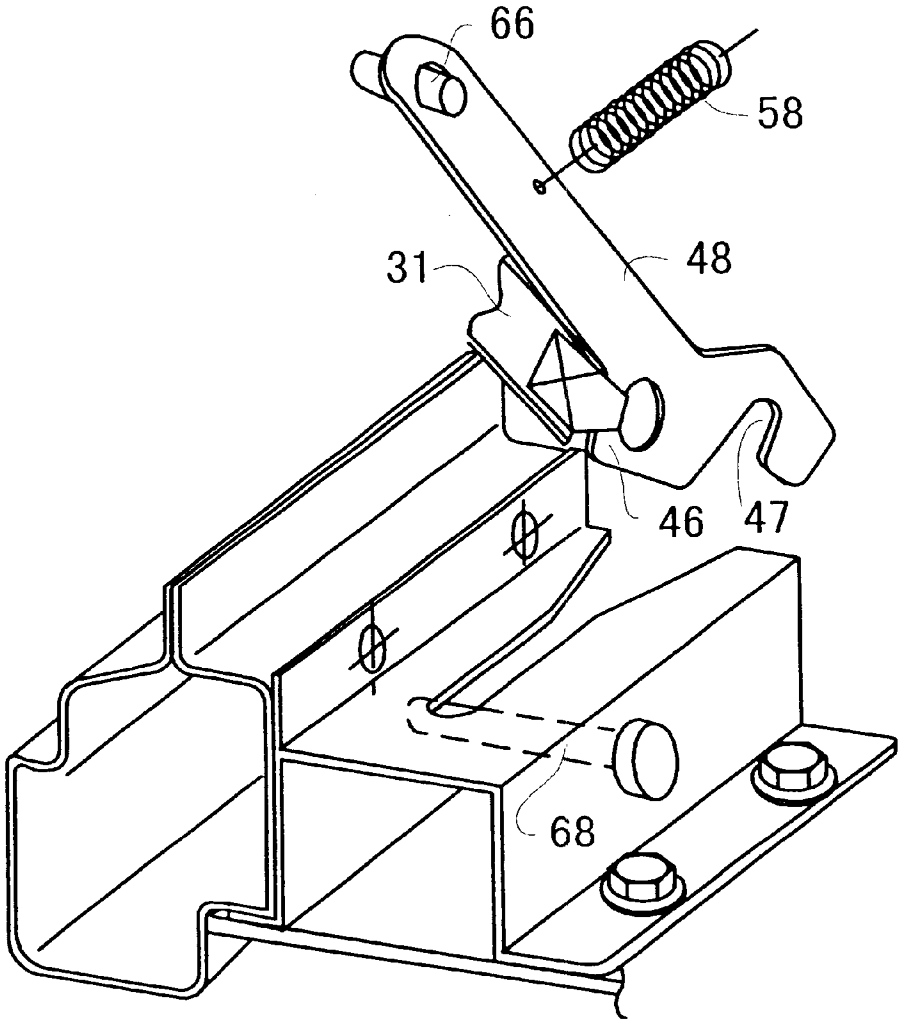
FIG. 4 is a perspective view of a lap anchor according to a second embodiment of the present invention, taken from the inboard side.
Figure 5:
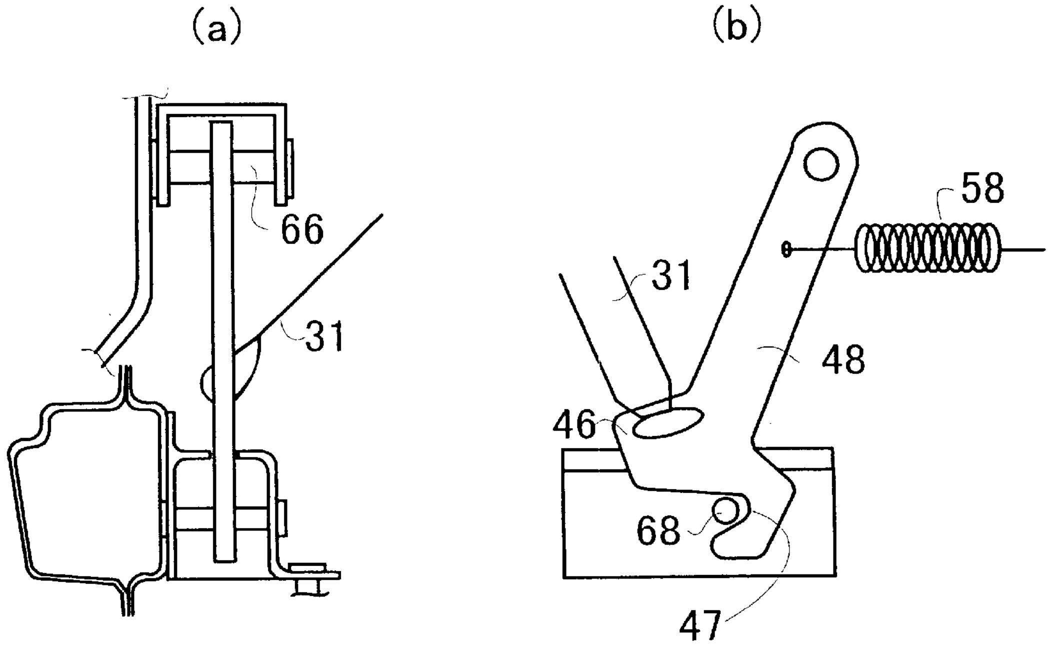
FIG. 5(*a*) is a partial elevational view and FIG. 5(*b*) is a partial side view of a lap anchor according to the second embodiment of the present invention.

As shown in FIG. 4 and FIG. 5, the lap anchor according to a second embodiment of the present invention includes: an anchor link 48 integrally formed with the lap anchor 46; a pivoting member 66 disposed on the rear door 3 and supporting the anchor link 48 in a pivotable manner in the vehicular longitudinal direction for allowing the anchor link 48 to pivotally move in the vehicular forward and downward direction by tension of the webbing 31 when the rear door 3 is closed and the tongue and buckle set 36 is fastened; a spring 58 connected to the anchor link 48 and producing a biasing force in the vehicular rearward and upward direction for moving the anchor link 48 to such a position that the link 48 does not impede the opening and closing motion of the rear door 3, when the rear door 3 is open and the tongue and buckle set 36 is released; and an anchor pin 68 fixed to the body below the rear door 3 for bearing the load acting on the webbing 31 on the body side after the anchor link 48 pivots to engage the pin 68, when the rear door 3 is closed and the tongue and buckle set 36 is fastened.

The lap anchor of the second embodiment operates as follows. After the rear door 3 shifts from its open state to its closed state, a passenger applies tension on the webbing 31 for fastening the tongue and buckle set 36. The tension is transmitted to the lap anchor 46. This causes the lap anchor 46 to start pivotal movement in the vehicular forward and downward direction about the pivoting member 66. Then, the lap anchor 46 moves in the vehicular forward and downward direction against biasing force in the vehicular rearward and upward direction produced by the spring 58. The lap anchor 46 terminates its movement in the vehicular forward and downward direction in such a manner that the anchor pin 68 engages a notch 47 formed at the lower portion of the anchor link 48 integral with the lap anchor 46.

When the webbing 31 spans from the retractor 32 to the lap anchor 46 via the shoulder anchor 35 and the tongue and buckle set 36, the retractor 32 applies tension to the lap anchor 46 through the webbing 31, which maintains the engagement between the anchor link 48 and the anchor pin 68.

However, when tongue 36*a* is released from the buckle 36*b* of the tongue and buckle set 36 before the rear door 3 shifts from its closed state to its open state, the webbing 31 becomes free from tension, so that the biasing force from spring 58 in the vehicular rearward and upward direction takes over, causing the anchor link 48 to quickly pivot about the pivoting member 66 and to move in the vehicular rearward and upward direction.

Figure 6:
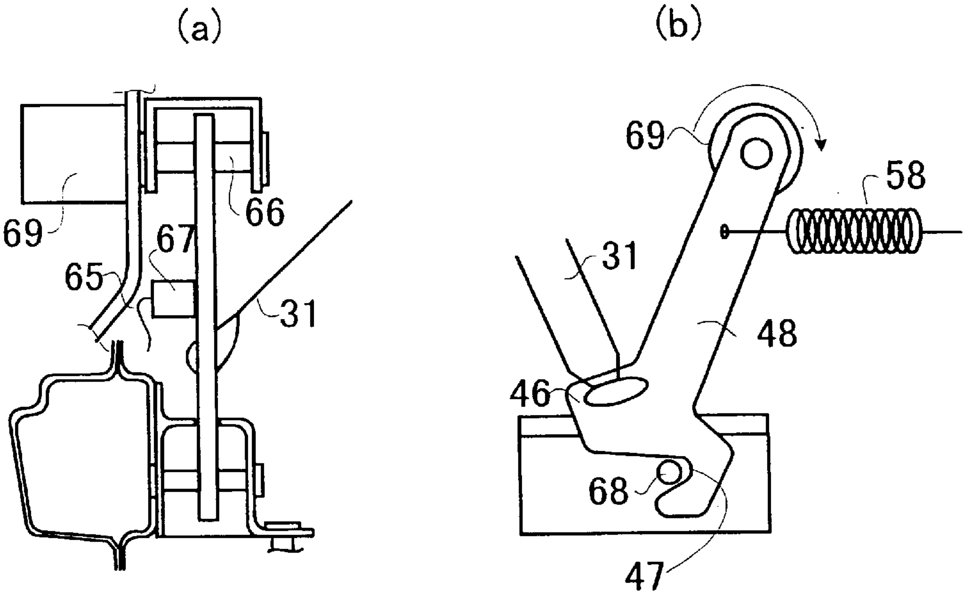
FIG. 6(*a*) is a partial elevational view and FIG. 6(*b*) is a partial side view of a lap anchor according to a third embodiment of the present invention.

As shown in FIG. 6, a lap anchor according to a third embodiment of the present invention includes: a motor 69 connected to the pivoting member 66 for allowing the pivoting member to pivotally move; and a stopper mechanism 67 for retaining the anchor link 48 at an engaging position with the anchor pin 68, which are in addition to the structure of the second embodiment.

In the lap anchor 46 of the second embodiment, the passenger or the retractor 32 apply or applies tension to cause the pivotal movement of the anchor link 48. According to the structure in the third embodiment, however, similar to the motor control of the first embodiment, a change in the state of the rear door 3 is detected in the form of a change in output voltage at a rear door switch (not shown) disposed in the rear door 3 or a buckle switch (not shown) disposed on the tongue and buckle set 36. The motor 69 is then rotated clockwise as shown in FIG. 6(*b*) (or in the direction indicated by the arrow in FIG. 6) after the rear door 3 is confirmed to have shifted from the open state to the closed state. As a result, the anchor link 48 connected to the pivoting member 66 moves in the vehicular forward and downward direction against the biasing force of spring 58 in the vehicular rearward and upward direction.

The vehicular forward and downward movement of the anchor link 48 terminates in such a manner that the notch 47 formed at the lower end of the anchor link 48 integral with the lap anchor 46 engages the anchor pin 68 fixed to the body below the rear door 3. At the same time, similar to the first embodiment, the stopper mechanism 67 retains the anchor link 48 at the position.

When the rear door 3 shifts from its closed state to its open state, similar to the first embodiment, the operation of the rear-door knob (not shown) causes the stopper mechanism 67 to release the retention of the anchor link 48 via the cable 65 connecting the rear-door knob with the stopper mechanism 67. Then, the anchor link 48 is quickly rotated about the pivoting member 66 to move in the vehicular rearward and upward direction by the vehicular rearward and upward biasing force of the spring 58 disposed on the anchor link 48.

According to the preferred embodiments described above, when the rear door 3 shifts from its open state to its closed state and the tongue 36*a* engages the buckle 36*b* of the tongue and buckle set 36, the lap anchor 42 in the first embodiment or the lap anchor 46 in the second and third embodiments automatically moves to the lower position without the operation by the passenger. Therefore, even in a vehicle providing a relatively lower hip point for the passenger, the webbing 31 restrains the passenger at the adequate height so as to optimize the passenger protection with the seat belt system.

In addition, when the seat belt is fastened after the rear door 3 shifts from its open state to its closed state, load transmitted from the webbing 31 can be shared by the body and the rear door 3 through the supporting member 62 on the rear door 3 and the anchor pin 64 fixed on the body in the first embodiment, or through the pivoting member 66 on the rear door and anchor pin 68 fixed on the body in the second and third embodiments. This allows the rear door and the body to undergo a lesser amount of load, which can prevent deformation or damage to the rear door and the body to ensure passenger restraint performance of the seat belt system.

Furthermore, in the first embodiment, when the rear door 3 shifts from its open state to its closed state, the motor 51 slowly lowers the anchor point, so as to ensure that anchor bracket 44 engages the anchor pin 64. On the other hand, when the rear door 3 shifts from its closed state to its open state, the spring 57 quickly moves the anchor bracket 44 to such a position that the bracket 44 does not impede the opening motion of the rear door 3. Therefore, the rear door 3 freely opens and closes in a reliable manner, and the height of the anchor point is optimized when the seat belt is fastened, which ensures safety of the passenger.

Likewise, according to the other embodiments, when the rear door 3 shifts from its open state to its closed state and the tongue 36*a* engages the buckle 36*b* of the tongue and buckle set 36, the anchor point is slowly lowered by tension applied by the retractor 32 through the webbing 31 in the second embodiment, or by the rotational force of the motor 69 in the third embodiment, so as to ensure that anchor link 48 engages the anchor pin 68. However, when the rear door 3 shifts from its closed state to its open state after the tongue 36*a* is released from the buckle 36*b* spring 58 quickly moves the anchor link 48 to such a position that the link 48 does not impede the opening movement of the rear door 3. Therefore, the rear door 3 freely opens and closes in a reliable manner, and the height of the anchor point is optimized when the seat belt is fastened, which ensures safety of the passenger.

Additionally, the movement of the lap anchor is achieved with a small number of elements: the motor 51, the gear 53, the link 55, the spring 57, and the stopper pin 59 in the first embodiment; the pivoting member 66 and the spring 58 in the second embodiment; and, the pivoting member 66, the spring 58, the motor 69, and the stopper mechanism 67 in the third embodiment. This achieves both space-saving and cost-reduction.

It should be appreciated that although the first embodiment of the present invention uses the motor 51 as the moving mechanism 50 for moving the lap anchor 42, a hydraulic system or other mechanisms may be used as the mechanism 50.

Although the present invention has been described in relation to particular embodiments thereof, many other variations and modifications and other uses will become apparent to those skilled in the art. It is preferred therefore, that the present invention be limited not by the specific disclosure herein, but only by the appended claims.

What is claimed is:

1. A seat belt system for a vehicle for restraining an occupant in a first seat mounted in a passenger compartment of the vehicle, the vehicle including an opening formed on at least one side of a vehicular body, the seat belt system comprising:

a belt webbing having a first and second end;

a retractor disposed at a door of the vehicle for retracting the first end of said belt webbing; and lap-anchor means disposed at the door of the vehicle for fixedly supporting said belt webbing below and outward of the first seat, wherein said lap-anchor means includes an anchor bracket to which the second end of said belt webbing is connected, said anchor bracket including an engaging portion which communicates with an engageable part disposed on the vehicular body below the opening, said anchor bracket being movable between a first position above the lower edge of the door where said anchor bracket does not impede the opening and closing motion of the door and a second position below the lower edge of the opening where said engaging portion engages the engageable part when the door is closed, and a moving means for moving said anchor bracket between the first position and the second position.

2. A seat belt system for a vehicle as defined in claim 1, wherein said moving means comprises a spring for moving said anchor bracket from the second position to the first position, and a motor for moving said anchor bracket from the first position to the second position against the biasing force of said spring.

3. A seat belt system for a vehicle as defined in claim 1, wherein said moving means comprises a spring for moving said anchor bracket from the second position to the first position, wherein said anchor bracket is moved from the first position to the second position by tension of said belt webbing against the biasing force of said spring when said seat belt system is fastened.

4. A seat belt system for a vehicle as defined in claim 1, wherein said anchor bracket is slidably disposed in a vertical direction with respect to the vehicular body.

5. A seat belt system for a vehicle as defined in claim 1, wherein said anchor bracket pivots with respect to the vehicular body.

6. A seat belt system for a vehicle as defined in claim 2, further comprising a gear for transmitting the rotation of said motor, and a link connected between said gear and said anchor bracket for transforming the rotation of the gear into vertical movement of said anchor bracket.

7. A seat belt system for a vehicle as defined in claim 1, further comprising a shoulder anchor disposed on the door, and a tongue and buckle set including a tongue slidably supported on said belt webbing and a buckle fixed to the vehicular body inward of the seat, wherein said belt webbing, said lap-anchor means, said shoulder anchor, and said tongue and buckle set provide a three-point seat belt restraint configuration for the front seat when the tongue and the buckle are fastened and said engaging portion engages the engageable part.

8. A seat belt system for a vehicle as defined in claim 1, wherein the vehicle includes an opening formed on at least one side of the vehicular body and a first door supported on the vehicular body by at least one first hinge, the first door being pivotable between a first position where the first door closes at least a part of the opening and a second position where the first door opens the opening.

9. A seat belt system for a vehicle as defined in claim 8, wherein the vehicle further comprises a second door adjacent the first door, the second door being pivotably supported on the vehicle body by at least one second hinge, wherein the first door and the second door cooperatively close the opening.

10. A seat belt system for a vehicle as defined in claim 9, wherein, the opening is preferably a single continuous opening formed in the at least one side of the vehicular body.

11. A seat belt system for a vehicle as defined in claim 10, further comprising a second seat mounted rearward of the first seat in the passenger compartment of the vehicle, wherein said seat belt system is disposed to restrain an occupant in the first seat when the first door is in the first position.

12. A seat belt system for a vehicle as defined in claim 1, wherein the engageable part comprises a pin located at the lower edge of the door.

13. A seat belt system for a vehicle for restraining an occupant, the vehicle including a front seat and a rear seat arranged in the vehicular longitudinal direction in a vehicle compartment, an opening continuously formed on at least one side of a vehicular body, a front door swingably supported on the vehicular body at a leading edge by way of a first hinge, and a rear door swingably supported on the vehicular body at a trailing edge by way of a second hinge, wherein the front door and the rear door cooperatively constitute a double door configuration for the opening, the seat belt system comprising:

a belt webbing having a first and second end;

a retractor disposed at the rear door of the vehicle for retracting the first end of said belt webbing;

a shoulder anchor disposed on the rear door;

a tongue and buckle set including a tongue slidably supported on said belt webbing and a buckle fixed to the vehicular body inboard of the front seat; and lap-anchor means disposed at the rear door of the vehicle for fixedly supporting said belt webbing below and outward of the front seat, said lap-anchor means including an anchor bracket to which the second end of said belt webbing is connected, the anchor bracket including an engaging portion which communicates with an engageable part provided at the vehicular body below the opening, said anchor bracket being movable between a first position above the lower edge of the rear door where said anchor bracket does not impede the opening and closing motion of the rear door and a second position below the lower edge of the opening where said engaging portion engages the engageable part when the rear door is closed, and a moving means for moving said anchor bracket between the first position and the second position, wherein said belt webbing, said lap-anchor means, said shoulder anchor, and said tongue and buckle set provide a three-point seat belt restraint configuration for the front seat when the tongue and the buckle are fastened and said engaging portion engages the engageable part.

14. A seat belt system for a vehicle for restraining an occupant, the vehicle including a front seat and a rear seat arranged in the vehicular longitudinal direction in a vehicle compartment, an opening continuously formed on at least one side of a vehicular body, a front door swingably supported on the vehicular body at a leading edge by way of a first hinge, and a rear door swingably supported on the vehicular body at a trailing edge by way of a second hinge, wherein the front door and the rear door cooperatively constitute a double door configuration for the opening, the seat belt system comprising:

a belt webbing having a first and second end;

a retractor disposed at the rear door of the vehicle for retracting the first end of said belt webbing;

a shoulder anchor disposed on the rear door;

a tongue and buckle set including a tongue slidably supported on said belt webbing and a buckle fixed to the vehicular body inboard of the front seat; and lap-anchor means disposed at the rear door of the vehicle for fixedly supporting said belt webbing below and outward of the front seat, said lap-anchor means including an anchor bracket to which the second end of said belt webbing is connected, the anchor bracket including an engaging portion which communicates with an engageable part provided at the vehicular body below the opening, said anchor bracket being pivotally movable between a first position above the lower edge of the rear door where said anchor bracket does not impede the opening and closing motion of the rear door and a second position below the lower edge of the opening where said engaging portion engages the engageable part when the rear door is closed, and a spring for moving said anchor bracket from the second position to the first position, wherein said anchor bracket is moved from the first position to the second position by tension of said belt webbing against the biasing force of said spring when said seat belt system is fastened, said belt webbing, said lap-anchor means, said shoulder anchor, and said tongue and buckle set providing a three-point seat belt restraint configuration for the front seat when the tongue and the buckle are fastened and said engaging portion engages the engageable part.

15. A seat belt system for a vehicle for restraining an occupant, the vehicle including a front seat and a rear seat arranged in the vehicular longitudinal direction in a vehicle compartment, an opening continuously formed on at least one side of a vehicular body, a front door swingably supported on the vehicular body at a leading edge by way of a first hinge, and a rear door swingably supported on the vehicular body at a trailing edge by way of a second hinge, wherein the front door and the rear door cooperatively constitute a double door configuration for the opening, the seat belt system comprising:

a belt webbing having a first and second end;

a retractor disposed at the rear door of the vehicle for retracting the first end of said belt webbing;

a shoulder anchor disposed on the rear door;

a tongue and buckle set including a tongue slidably supported on said belt webbing and a buckle fixed to the vehicular body inboard of the front seat; and lap-anchor means disposed at the rear door of the vehicle for fixedly supporting said belt webbing below and outward of the front seat, said lap-anchor means including an anchor bracket to which the second end of said belt webbing is connected, the anchor bracket including an engaging portion which communicates with an engageable part provided at the vehicular body below the opening, said anchor bracket being pivotally movable between a first position above the lower edge of the rear door where said anchor bracket does not impede the opening and closing motion of the rear door and a second position below the lower edge of the opening where said engaging portion engages the engageable part when the rear door is closed, a spring for moving said anchor bracket from the second position to the first position, and a motor for moving said anchor bracket from the first position to the second position against the biasing force of said spring, wherein said belt webbing, said lap-anchor means, said shoulder anchor, and said tongue and buckle set provide a three-point seat belt restraint configuration for the front seat when the tongue and the buckle are fastened and said engaging portion engages the engageable part.

16. A seat belt system for a vehicle for restraining an occupant in a first seat mounted in a passenger compartment of the vehicle, the vehicle including an opening formed on at least one side of a vehicular body, the seat belt system comprising:

a belt webbing having a first and second end;

a retractor disposed at a door of the vehicle for retracting the first end of said belt webbing;

an anchor bracket disposed at the door of the vehicle for fixedly supporting the second end of said belt webbing below and outward of the first seat, said anchor bracket including an engaging portion which communicates with an engageable part disposed on the vehicular body below the opening, said anchor bracket being moveable between a first position above the lower edge of the door where said anchor bracket does not impede the opening and closing motion of the door and a second position below the lower edge of the opening where said engaging portion engages the engageable part when the door is closed, a spring disposed between the door and said anchor bracket for moving said anchor bracket from the second position to the first position, a motor disposed on the door for moving said anchor bracket from the first position to the second position against the biasing force of said spring.

17. A seat belt system for a vehicle for restraining an occupant in a first seat mounted in a passenger compartment of the vehicle, the vehicle including an opening formed on at least one side of a vehicular body, the seat belt system comprising:

a belt webbing having a first and second end;

a retractor disposed at a door of the vehicle for retracting the first end of said belt webbing;

an anchor bracket disposed at the door of the vehicle of fixedly supporting the second end of said belt webbing below and outward of the first seat, said anchor bracket including an engaging portion which communicates with an engageable part disposed on the vehicular body below the opening, said anchor bracket being movable between a first position above the lower edge of the door where said anchor bracket does not impede the opening and closing motion of the door and a second position below the lower edge of the opening where said engaging portion engages the engageable part when the door is closed, a spring disposed between the door and said anchor bracket for moving said anchor bracket from the second position to the first position, wherein, said anchor bracket is moved from the first position to the second position by tension of said belt webbing against the biasing force of said spring when said seat belt system is fastened.

* * * * *